(12) United States Patent
Morikawa (10) Patent No.: US 8,331,758 B2
(45) Date of Patent: Dec. 11, 2012

(54) IMAGE PLAYBACK APPARATUS AND CONTROL METHOD

(75) Inventor: Goichi Morikawa, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 12/360,762

(22) Filed: Jan. 27, 2009

(65) Prior Publication Data

US 2009/0190665 A1    Jul. 30, 2009

(30) Foreign Application Priority Data

Jan. 30, 2008    (JP) .................................. 2008-019362

(51) Int. Cl.
*H04N 5/765* (2006.01)
(52) U.S. Cl. .................... 386/233; 386/232; 386/235
(58) Field of Classification Search .................... 386/46, 386/98, 111, 112, 125, 126
See application file for complete search history.

(56) References Cited

U.S. PATENT DOCUMENTS

| | | | | |
|---|---|---|---|---|
| 6,795,641 | B2 * | 9/2004 | Okada et al. | 386/95 |
| 7,200,272 | B2 * | 4/2007 | Ishikawa | 382/233 |
| 7,215,876 | B2 * | 5/2007 | Okada et al. | 386/96 |
| 2001/0043799 | A1 * | 11/2001 | Okada et al. | 386/95 |

FOREIGN PATENT DOCUMENTS

| | | |
|---|---|---|
| JP | 2006-115245 | 4/2006 |
| JP | 2008-186172 A | 8/2008 |
| JP | 2008-301309 A | 12/2008 |

OTHER PUBLICATIONS

Explanation of Non-English Language Reference.

* cited by examiner

*Primary Examiner* — Jamie Atala
(74) *Attorney, Agent, or Firm* — Knobbe Martens Olson & Bear LLP (57) ABSTRACT

According to one embodiment, an image playback apparatus which plays back data stream stored in a recording medium while decoding it, the apparatus includes a reading section which reads the data stream from the recording medium, a separation section which separates the data stream read by the reading section into audio data and video data, a memory including a first memory region allocated therein which temporarily stores the audio data output from the separation section and a second memory region allocated therein which temporarily stores the video data output from the separation section.

10 Claims, 6 Drawing Sheets

IMAGE PLAYBACK APPARATUS AND CONTROL METHOD

CROSS-REFERENCE TO RELATED APPLICATIONS

This application is based upon and claims the benefit of priority from Japanese Patent Application No. 2008-019362, filed Jan. 30, 2008, the entire contents of which are incorporated herein by reference.

BACKGROUND

1. Field

One embodiment of the present invention relates to a technique of controlling a playback apparatus comprising a motion picture reproducing function, and more specifically to an image playback apparatus with an improved playback quality, and a control method employed in the apparatus.

2. Description of the Related Art

Recently, image playback apparatus which can play back highly definition images have been developed. In the decoding process of these high definition images, an enormous amount of data processing is required. Some playback apparatus do not involve a sufficient memory capacity or decoding process. For example, Jpn. Pat. Appln. KOKAI Publication No. 2006-115245 discloses a playback technique which can prevent the failure of the buffer and carry out playback while maintaining the synchronization of video and audio signals at a good level by switching a method of outputting data stream at a timing similar to the input timing upon start of the playback of TS from a recording medium and switch of a special playback and an ordinary playback, and a method of outputting data stream in reply to data request from a decoder during decoding operation.

However, in the motion picture playback apparatus disclosed in Jpn. Pat. Appln. KOKAI Publication No. 2006-115245, the size of input queue of the decoder is set based on an expected value from experience plus an allowance. Even if such setting is carried out, the buffer fails in some cases depending on the contents to be played back. Especially, the order of video data and audio data in a data stream is arbitrary, such a case possibly occurs in which one type of data overflows from the buffer while the other type of data lacks.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an image playback apparatus to play back data stream stored in a recording medium while decoding it, the apparatus includes: a reading section to read the data stream from the recording medium; a separation section to separate the data stream read by the reading section into audio data and video data; a memory including a first memory region allocated therein which temporarily stores the audio data output from the separation section and a second memory region allocated therein which temporarily stores the video data output from the separation section; an audio decoding section to read and decode the audio data temporarily stored in the first memory region; a video decoding section to read and decode the video data temporarily stored in the second memory region; a monitoring section to monitor a data amount of each of the video data and audio data stored in the first and second memory regions, respectively; and a memory capacity adjustment section which, when the data amount of either one of the first and second memory regions becomes a first threshold value or more, and the data amount of the other memory region becomes a second threshold value which is smaller than the first threshold value, or less, temporarily increases the capacity of the memory region which has become the first threshold value or more.

An embodiment of the present invention will now be described with reference to accompanying drawings.

First, with reference to FIGS. 1 and 2, the structure of an image playback apparatus according to an embodiment of the present invention will be explained. The image playback apparatus is, for example, realized as a notebook personal computer 10.

Figure 1:
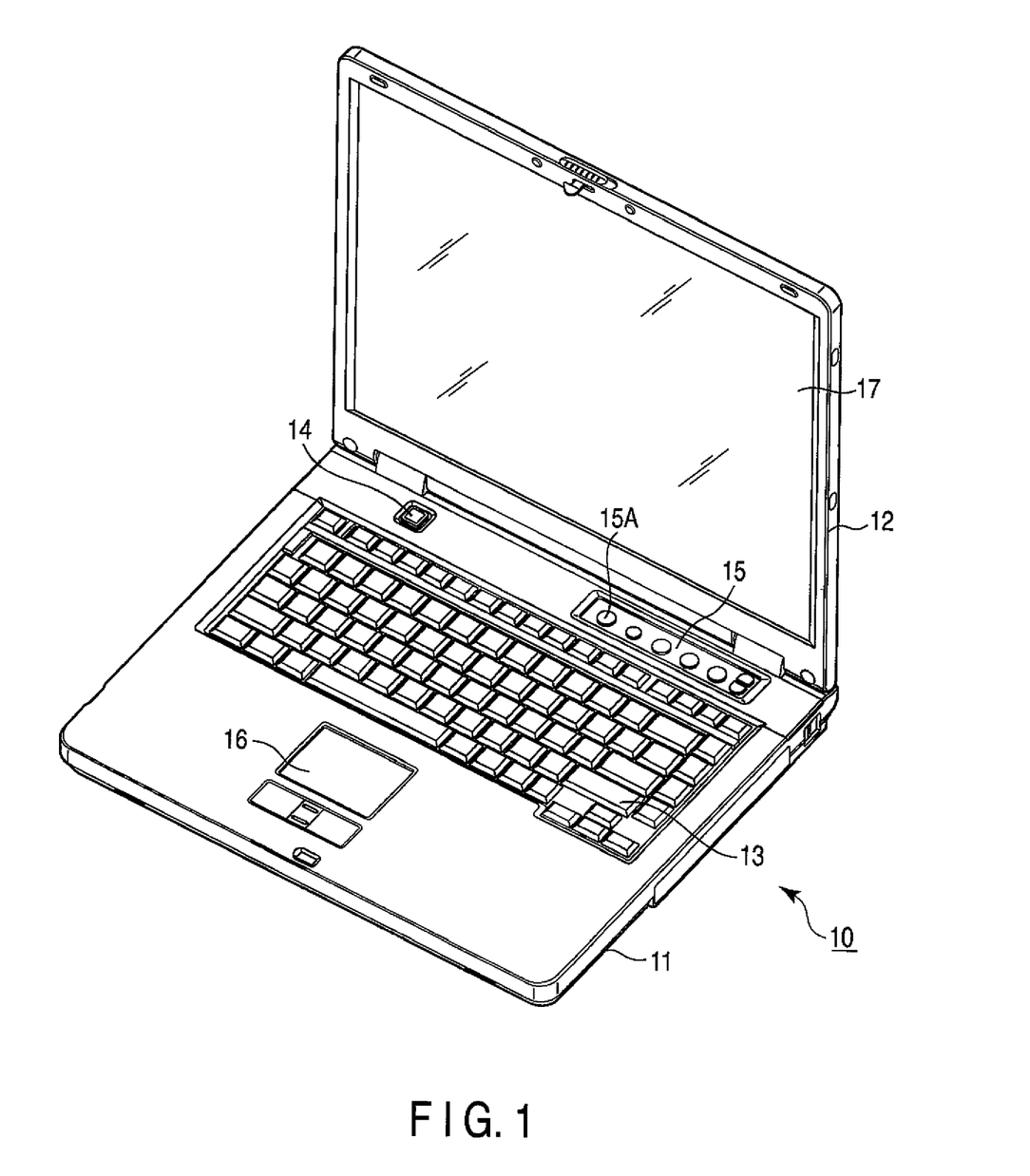
FIG. 1 is an exemplary schematic diagram showing an image playback apparatus according to an embodiment of the present invention.

FIG. 1 is a perspective diagram showing the notebook personal computer 10 while the display unit is open. This computer 10 includes a computer main body 11 and a display unit 12. The display unit 12 contains a built-in display device configured of a liquid crystal display (LCD) 17, and the display screen of the LCD 17 is located substantially at the center of the display unit 12.

The display unit 12 is mounted to be pivotable between an open position and a close position on the computer main body 11. The computer main body 11 includes a thin box-shaped cabinet, on an upper surface of which, a keyboard 13, a power button 14 which turns ON/OFF the computer 10, an operation panel 15, a touch pad 16, etc. are arranged.

The operation panel 15 is an entry device comprising a plurality of buttons which respectively start various functions, and it is used to enter an event corresponding to a button pressed by the user. The group of these buttons include a video playback application start button 15A. The video playback application start button 15A is a start button for the video playback application which plays back video contents stored in a recording medium such as a high definition digital versatile disk (HD DVD), and when it is pressed by the user, the application program for reproducing video contents is booted.

Next, with reference to FIG. 2, the system configuration of the computer 10 will be described.

Figure 2:
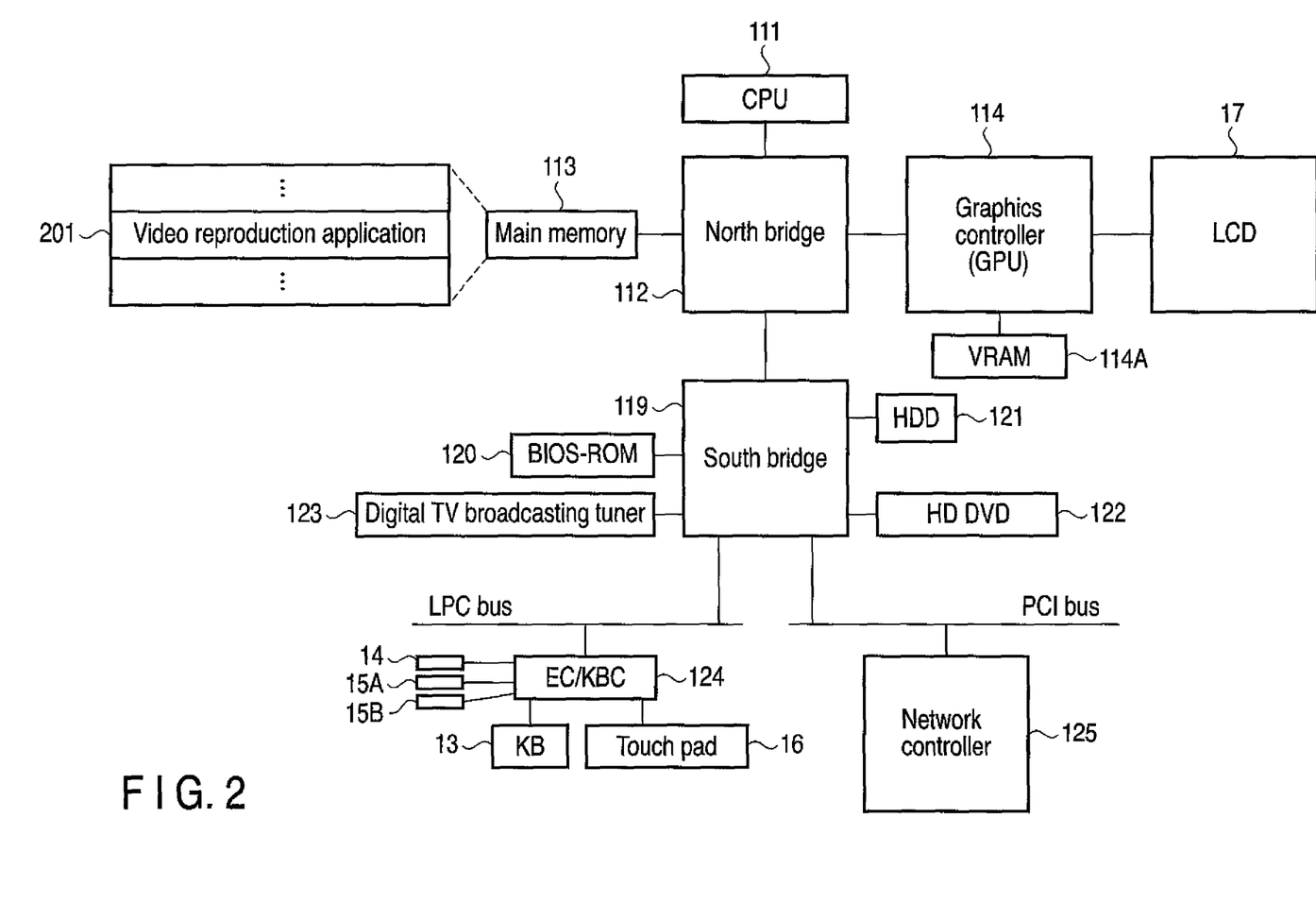
FIG. 2 is an exemplary block diagram showing a configuration of the image playback apparatus according to the embodiment.

As shown in FIG. 2, the computer 10 of this embodiment includes a CPU 111, a north bridge 112, a main memory 113, a graphics controller 114, a south bridge 119, a BIOS-ROM 120, a hard disk drive (HDD) 121, an HD DVD drive (HD DVD) 122, an embedded controller/keyboard controller IC (EC/KBC) 124, a network controller 125, the video playback application start button 15A etc.

The CPU 101 is a processor which controls the operation of the computer 10 and it executes an operating system (OS) and various types of application programs including a video playback application 201, loaded to the main memory 113 from the hard disk drive (HDD) 121.

Further, the CPU 101 executes Basic Input Output System (BIOS) stored in the BOIS-ROM 120. System BIOS is a program for controlling the hardware.

The north bridge 112 is a bridge device which connects between a local bus of the CPU 111 and the south bridge 119. The north bridge 112 also contains an integrated memory controller which controls the access of the main memory 113. Further, the north bridge 112 also has a function of executing communications with the graphics controller GPU 114 via, for example, an accelerated graphics port (AGP) bus.

The graphics controller 114 is a display controller which controls the LCD 17 used as the display monitor of the computer 10. The graphics controller 114 generates a display signal from image data written in a video memory (VRAM) 114A, which is to be sent to the LCD 17.

The south bridge 119 controls each device on a low pin count (LPC) buss and each device on a peripheral component interconnect (PCI) buss. The south bridge 119 also contains a built-in integrated drive electronics (IDE) controller which controls the hard disk drive (HDD) 121 and ODD drive 122.

The HDD 121 is a memory device which stores various types of software applications and data. The HD DVD drive 122 is a drive unit which reads out data from a recording medium which stores video contents while rotating it. An example of the recording medium is HD DVD.

The embedded controller/keyboard controller IC (EC/KBC) 124 is a one-chip microcomputer in which an embedded controller for managing the power and a keyboard controller for controlling the keyboard (KB) 13 and touch pad (16) are integrated. The embedded controller/keyboard controller IC (EC/KBC) 124 has a function of turning ON/OFF the power of the computer 10 in accordance with the user's manipulation of the power button 14. Further, the embedded controller/keyboard controller IC (EC/KBC) 124 executes the process of turning ON/OFF of the power of the computer 10 in accordance with the user's manipulation of the video playback application start button 15A. The network controller 125 is a communication device which executes communications with an external network, for example, the Internet.

The video playback application 201 is a software application by which, for example, the HD DVD drive 122 reads compressed and coded motion picture data (data stream) from an optical disk, and decode and play back the data. The video playback application 201 is a software decoder which complies with, for example, MPEG-2 or H.264/AVC. That is, the video playback application 201 involves a function which decodes a motion picture stream (such as video contents of the high definition (HD) standard to be read from an optical disk by the HD DVD drive 122) compressed and encoded in a encoding system defined by, for example, MPEG-2 or H.264/AVC.

The main memory 113 also serves as, when decoding video data and audio data extracted from a motion picture stream read out from the HD DVD, a queue which temporarily stores these data. The capacity of the queue can be increased or decreased by an instruction of assigning the capacity from, for example, the video playback application 201 (for example, by variable length).

Figure 3:
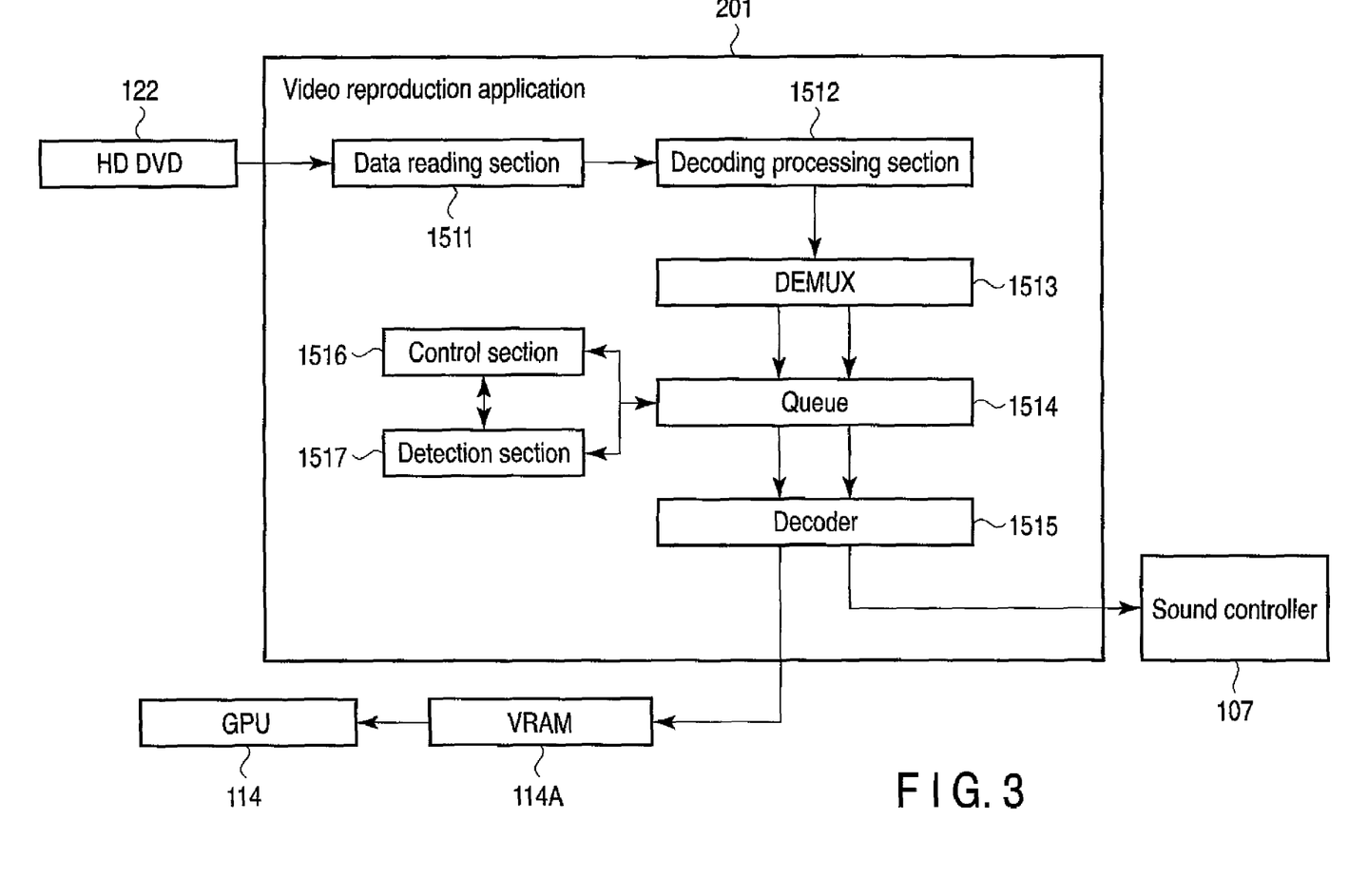
FIG. 3 is an exemplary block diagram briefly showing main functions of the image playback apparatus according to the embodiment.

Next, the configuration of the video playback application 201 will now be described with reference to FIG. 3.

The video playback application 201 includes a data reading section 1511, a decoding processing section 1512, a DEMUX 1513, a queue 1514, a decoder 1515, a control section 1516 and a detection section 1517. The data reading section 1511 reads streaming data (motion picture data) recorded on a recording medium such as an HD DVD disk from the HDD drive 122.

The decoding processing section 1512, when the read streaming data is encoded, carries out the decoding process. The DEMUX 1513 processes the streaming data to divide into video data and audio data. The queue 1514 is a buffer memory which temporarily stores the video data and audio data output from the DEMUX 1513, and it is allocated as a memory region on, for example, the main memory 113. Here, the queue for the video data and the queue for the audio data are allocated as different memory regions from each other.

The decoder 1515 carries out decoding process on the video data and audio data temporarily stored in the queue 1514, and outputs the decoded video signals and audio signals to a VRAM 114A and a sound controller 107, respectively.

The control section 1516, when the detection section 1517 detects that the status of the use capacity of the queue satisfies a predetermined condition, changes the memory capacity allocated as the memory region for storing video data or audio data in the queue 14. The detection section 1517 monitors the state of the use capacity of the queue and notifies to the control section 1516 when the use capacity satisfies a predetermined condition.

Figure 4:
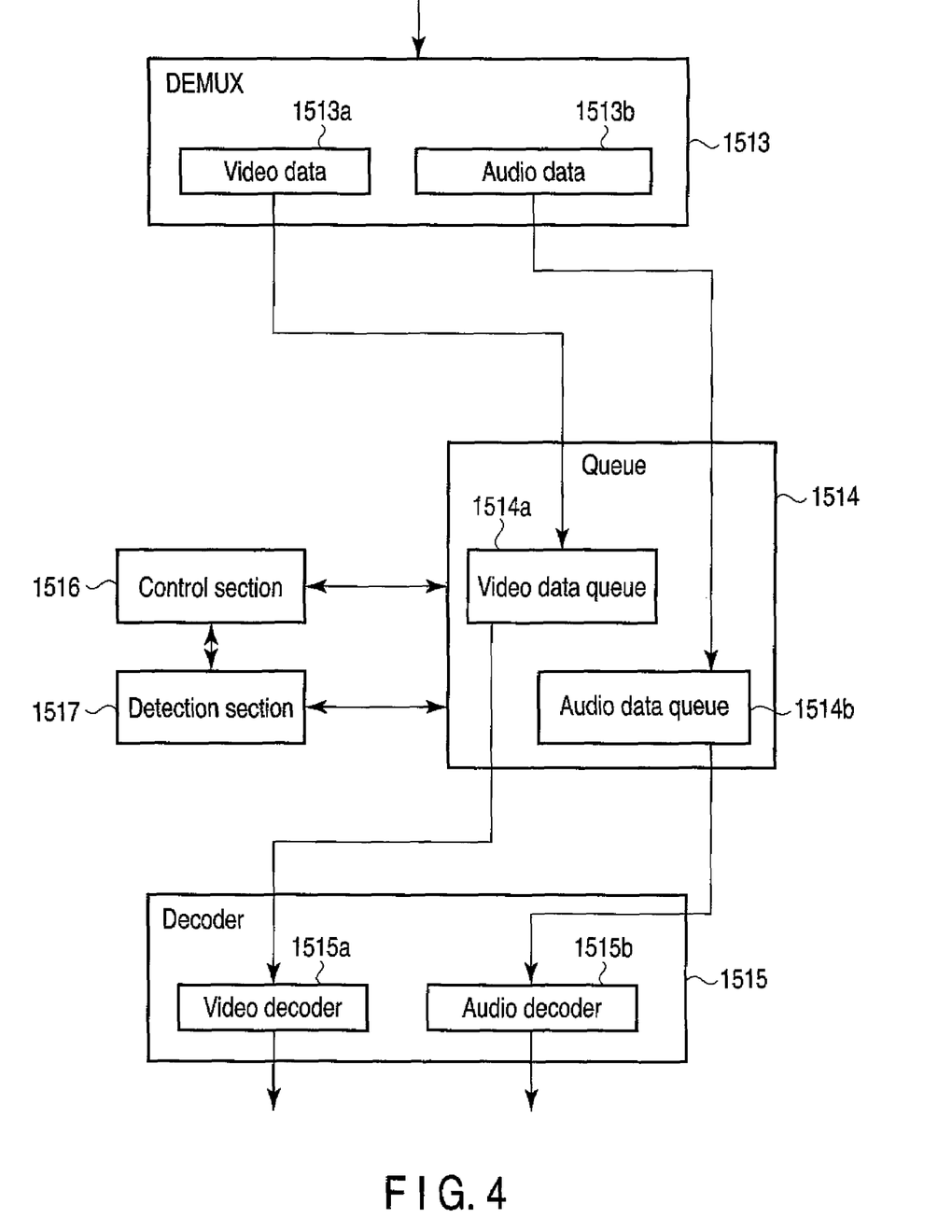
FIG. 4 is an exemplary block diagram showing a configuration of the function of a video playback application of the image playback apparatus according to the embodiment.

Next, the processes carried out by the video playback application 201 will now be described with reference to the conceptual diagram shown in FIG. 4. The streaming data input to the DEMUX 1513 is divided into video data 1513a and audio data 1513b by the DEMUX 1513, which are then temporarily stored in a video data queue 1514a and an audio data queue 1514b in the queue 1514. The detection section 1517 monitors the use capacity of each of the video data queue 1514a and the audio data queue 1514b. For example, when the use capacity of either one of the video data queue 1514a and the audio data queue 1514b exceeds 90% of the pre-allocated capacity, and the use capacity of the other one becomes less than 10% of the reference value, the detection section 1517 notifies it to the control section 1516. When receiving the notification, the control section 1516 carries out the process of increasing the capacity of the queue whose use capacity exceeded 90% by, for example, 10%.

A video decoder 1515a and an audio decoder 1515b respectively decode video data 1513a and audio data 1513b temporarily stored in the video data queue 1514a and audio data queue 1514b, respectively, into a video signal and an audio signal.

A controlling method applied to an image playback apparatus according to the embodiment configured as above will now be described with reference to FIGS. 5 to 9.

Figure 5:
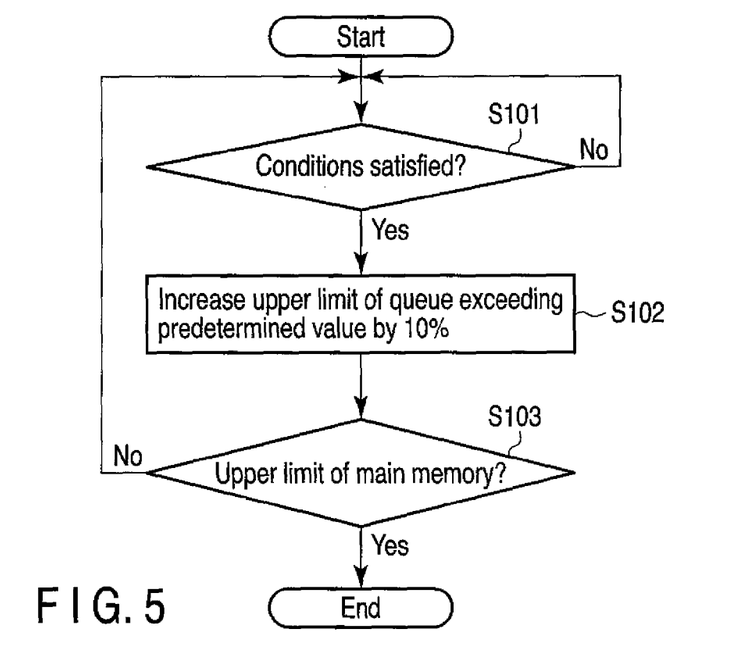
FIG. 5 is an exemplary flowchart illustrating a method of controlling the image playback apparatus according to the embodiment.

FIG. 5 is a flowchart illustrating the flow of the process of the case where the capacity of either one of the video data queue 1514a and audio data queue 1514b is increased.

Figure 6:
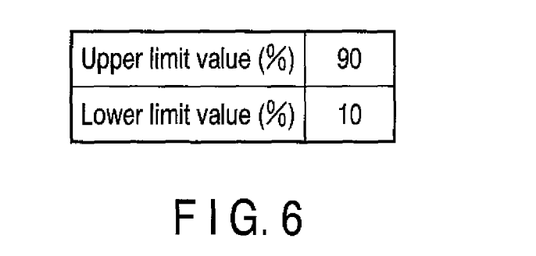
FIG. 6 is an exemplary conceptual diagram showing table data of the image playback apparatus according to the embodiment.
Figure 7:
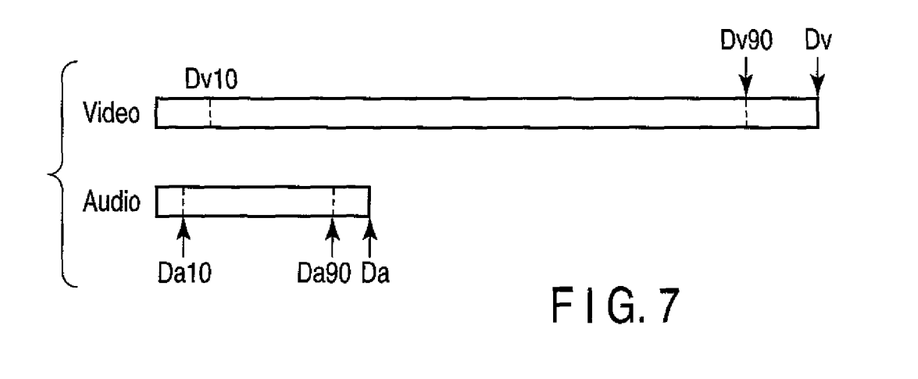
FIG. 7 is an exemplary conceptual diagram showing a configuration of a queue of the image playback apparatus according to the embodiment.
Figure 8:
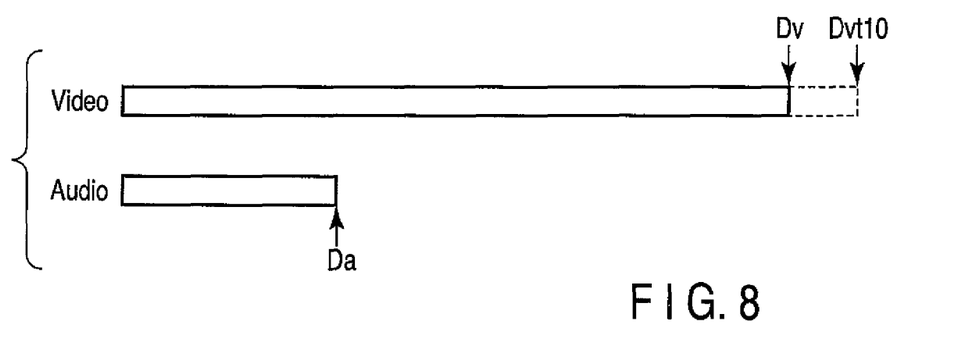
FIG. 8 is an exemplary conceptual diagram showing a configuration of a queue of the image playback apparatus according to the embodiment.

First, the threshold values, that is, the upper and lower limits of the use of the capacity of each of the video data queue 1514a and audio data queue 1513b are set. For example, as shown in FIG. 6, the upper limit value is set to 90% of the reference (default) value, whereas the lower limit value is set to 10% of the reference value. The reference value for the video data queue 1514a is expressed as, for example, Dv, and the reference value for the audio data queue 1514b is expressed as, for example, Da, as shown in FIG. 7. Further, 90% of the reference value (Dv) of the capacity of the video data queue 1514a is expressed as Dv90 and 10% of the reference value (Dv) is expressed as Dv10, whereas 90% of the reference value (Dv) of the capacity of the audio data queue 1514b is expressed as Da90 and 10% of the reference value (Da) is expressed as Da10.

When it is identified by the video playback application 201 that the conditions shown in FIG. 6 are satisfied (that is, for example, when the data amount of the video data 1513a is Dv90 or higher and the data amount of the audio data 1513b is Da10 or lower) (YES in block S101), the capacity of the one of the queues, which exceeded the predetermined value is increased by 10% (block S102). In other words, when the queue exceeding the predetermined value is, for example, the video data queue 1514a, the capacity of the video data queue 1514a is increased by 10% (to make, for example, Dv+10).

The capacity of the queue can be increased, at most, to the memory capacity of the main memory 113, and therefore, here, it is next judged if the capacity of the queue has reached the upper limit value of the main memory 113 (block S103). In the case where it is judged by the video playback application 201 that the sum of the video data queue 1514a and the audio data queue 1514b has not reached a certain portion (the upper limit value) of the memory capacity of the main memory 113 (NO in block S103), the operation retunes to block S101. On the other hand, in the case where it is judged by the video playback application 201 that the sum has reached the upper limit value of the main memory 113 (YES in block S103), the process is finished without increasing the capacity of the video data queue 1514a.

Similarly, if the case judged by the video playback application 201 that the conditions indicated in FIG. 6 are satisfied is that in which the data amount of the video data 1513a is Dv or less and the data amount of the audio data 1513b is Da or more, the queue exceeding the predetermined value is, for example, the video data queue 1514a. Therefore, the capacity of the audio data queue 1514b is increased by 10%.

Figure 9:
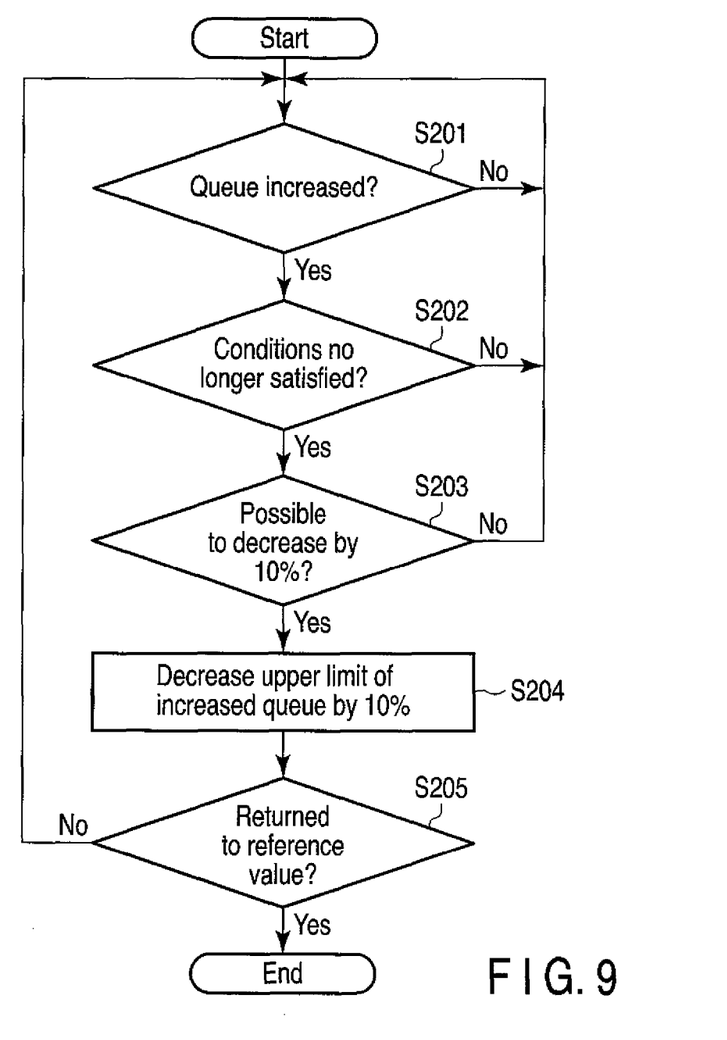
FIG. 9 is an exemplary flowchart illustrating a method of controlling the image playback apparatus according to the embodiment.

FIG. 9 is a flowchart illustrating the case where the capacity of either one of the video data queue 1514a and the audio data queue 1514b is increased, and thereafter, the capacity of that queue is decreased.

It is judged by the video playback application 201 as to whether or not the capacity of either one of the video data queue 1514a and the audio data queue 1514b has been increased to a value higher than the reference value (initial value) (block S201). If it is judged by the video playback application 201 that either one of the queues has been increased (YES in block S201), or that the conditions indicated in FIG. 6 are no longer satisfied (for example, when Dv90 is less than the threshold, etc.) (YES in block S202), it is judged as to whether or not the increased capacity of that queue can be decreased by 10% (block S203). If it is judged by the video playback application 201 that the increased capacity of that queue can be decreased by 10% (YES in block S203), the capacity of that queue is decreased by 10% (block S204). That is, for example, the capacity of the video data queue 1514a is decreased from Dv+10 to Dv (or from the state shown in FIG. 8 to that shown in FIG. 7). Next, the video playback application 201 judges whether or not the decreased capacity of the queue has returned to the reference value (for example, Dv) (block S205). If it is judged by the video playback application 201 that the decreased capacity of the queue has returned to the reference value (for example, Dv) (YES in block S205), the process is finished. On the other hand, if it is judged by the video playback application 201 that the decreased capacity of the queue has not returned to the reference value (for example, Dv) (or it can be further decreased) (NO in block S205), the operation is returned to block S201.

The present invention has been proposed in consideration of the above-described circumstances, and an object thereof is to provide an image playback apparatus which can suppress degradation of decoded image due to the overflow of queue from the buffer, and a method of controlling the apparatus.

As described above, the apparatus controls its operation to increase the capacity of the one of the queue which has exceeded a predetermined value, and thus it becomes possible to suppress such a failure that the input queue is filled up and the further input of data is stopped. Further, in the case the capacity of the input queue has a margin, the capacity of the input queue is decreased to the reference value by a certain process, and thus the memory can be utilized effectively by some other process.

It should be noted that the present invention is not limited to the above-described embodiment as it is, and when practicing the invention, it can be embodied while the structural elements are modified as long as the essence of the invention remains within the scope thereof. Further, various modified versions of the invention can be formed by combining some of the structural elements disclosed in the above embodiments as needed. For example, some of the structural elements may be deleted from the entire structure presented in the embodiment. Further, structural elements of difference embodiments may be combined as needed.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image playback apparatus configured to play back data stream stored in a recording medium while decoding the data stream, the apparatus comprising:

a reading module configured to read the data stream from the recording medium;

an extraction module configured to extract audio data and video data from the read data stream;

a memory comprising a first memory region configured to temporarily store the audio data output from the extraction module and a second memory region configured to temporarily store the video data output from the extraction module;

an audio decoder configured to read and decode the audio data temporarily stored in the first memory region;

a video decoder configured to read and decode the video data temporarily stored in the second memory region;

a monitor configured to monitor data amounts of the video data and audio data stored in the first and second memory regions, respectively; and a memory capacity adjustment module configured to temporarily increase the capacity of either the first or second memory region in a state when the data amount of either the first or second memory regions becomes a first threshold value and the data amount of either the second or first memory region becomes a second threshold value smaller than the first threshold value, respectively.

2. The image playback apparatus of claim 1, wherein the memory capacity adjustment module is configured to decrease the increased capacity of either the first or second memory region when the capacity of at least one of the first and second memory regions is increased and then the state is resolved.

3. The image playback apparatus of claim 2, wherein the memory capacity adjustment module is configured to set an initial value of the memory region to a substantially small limit value when the capacity of the increased memory region is set to be decreased.

4. The image playback apparatus of claim 3, wherein the memory capacity adjustment module is configured to increase the capacity of at least one of the first and second memory regions by increasing a threshold ratio of the capacities between the first and second memory regions when the capacity of at least one of the first and second memory regions is set to be increased.

5. The image playback apparatus of claim 3, wherein the memory capacity adjustment module is configured to increase or to decrease the capacities of the first and second memory regions by variable length.

6. A controlling method employed in an image playback apparatus configured to play back data stream stored in a recording medium while decoding the data stream, the method comprising:

reading the data stream from the recording medium;

extracting audio data and video data from the read data stream;

allocating a first memory region for temporarily storing the extracted audio data and a second memory region for temporarily storing the extracted video data in a memory;

reading and decoding the stored audio data, and reading and decoding the stored video data;

monitoring data amounts of the video data and audio data stored in the first and second memory regions, respectively; and temporarily increasing the capacity of either the first or second memory region in a state when the data amount of either the first or second memory regions becomes a first threshold value and the data amount of either the second or first memory region becomes a second threshold value smaller than the first threshold value, respectively.

7. The controlling method of claim 6, further comprising: decreasing the increased capacity of either the first or second memory region when the capacity of at least one of the first and second memory regions is increased and then the state is resolved.

8. The controlling method of claim 7, further comprising: setting an initial value of the memory region to a substantially small limit value when the capacity of the increased memory regions is set to be decreased.

9. The controlling method of claim 8, further comprising: increasing the capacity of at least one of the first and second memory regions by increasing a threshold ratio of the capacities between the first and second memory regions when the capacity of at least one of the first and second memory regions is set to be increased.

10. The controlling method of claim 8, further comprising: increasing or decreasing the capacities of the first and second memory regions by variable length.

* * * * *